(12) United States Patent
Asakawa et al.

(10) Patent No.: US 11,326,966 B2
(45) Date of Patent: May 10, 2022

(54) STRAIN GAUGE WITH IMPROVED DESIGN TO REDUCE PINHOLES AND DAMAGE

(71) Applicant: MINEBEA MITSUMI Inc., Nagano (JP)

(72) Inventors: Toshiaki Asakawa, Shizuoka (JP); Akiyo Yuguchi, Shizuoka (JP); Yuta Aizawa, Shizuoka (JP); Syota Taneda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 16/650,566

(22) PCT Filed: Sep. 27, 2018

(86) PCT No.: PCT/JP2018/035938
§ 371 (c)(1),
(2) Date: Mar. 25, 2020

(87) PCT Pub. No.: WO2019/065840
PCT Pub. Date: Apr. 4, 2019

(65) Prior Publication Data
US 2020/0333199 A1    Oct. 22, 2020

(30) Foreign Application Priority Data
Sep. 29, 2017   (JP) .............. JP2017-191822

(51) Int. Cl.
*G01L 1/22*    (2006.01)
*G01B 7/16*    (2006.01)
(52) U.S. Cl.
CPC ............. *G01L 1/2287* (2013.01); *G01B 7/18* (2013.01)

(58) Field of Classification Search
None
See application file for complete search history.

(56) References Cited

U.S. PATENT DOCUMENTS

| | | | |
|---|---|---|---|
| 4,758,816 A | 7/1988 | Blessing et al. |
| 4,786,887 A | 11/1988 | Bringmann et al. |
| 4,937,550 A | 6/1990 | Tawada et al. |
| 5,154,247 A | 10/1992 | Nishimura et al. |

(Continued)

FOREIGN PATENT DOCUMENTS

| | | |
|---|---|---|
| CN | 105091730 | 11/2015 |
| CN | 106248268 | 12/2016 |

(Continued)

OTHER PUBLICATIONS

Extended European Search Report dated May 11, 2021 with respect to the corresponding Eueopean Patent Application No. 18863058.6.

(Continued)

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a flexible substrate, and a functional layer formed of a metal, an alloy, or a metal compound, directly on one surface of the substrate. The strain gauge includes a resistor formed of a film including Cr, CrN, and $Cr_2N$, on one surface of the functional layer. The substrate includes a filler. Surface unevenness on one surface of the substrate is 15 nm or less, and the resistor has a film thickness of 0.05 μm or more.

11 Claims, 3 Drawing Sheets

(56) References Cited

U.S. PATENT DOCUMENTS

| | | |
|---|---|---|
| 5,914,168 A | 6/1999 | Wakamatsu et al. |
| 2004/0140868 A1 | 7/2004 | Takeuchi et al. |
| 2005/0188769 A1 | 9/2005 | Moelkner et al. |
| 2005/0276990 A1 | 12/2005 | Kohara et al. |
| 2016/0334289 A1 | 11/2016 | Kieffer et al. |
| 2018/0217016 A1 | 8/2018 | Inamori et al. |

FOREIGN PATENT DOCUMENTS

| | | |
|---|---|---|
| CN | 206192269 | 5/2017 |
| EP | 0171467 | 2/1986 |
| EP | 725392 | 8/1996 |
| JP | S61-176803 | 8/1986 |
| JP | S63-245962 | 10/1988 |
| JP | H04-038402 | 2/1992 |
| JP | H04-095738 | 3/1992 |
| JP | H06-137805 | 5/1994 |
| JP | H06-300649 | 10/1994 |
| JP | H08-102163 | 4/1996 |
| JP | H09-016941 | 1/1997 |
| JP | H10-270201 | 10/1998 |
| JP | 2002-221453 | 8/2002 |
| JP | 2004-072715 | 3/2004 |
| JP | 2007-173544 | 7/2007 |
| JP | 2015-031633 | 2/2015 |
| JP | 2016-074934 | 5/2016 |
| JP | 2016-136605 | 7/2016 |
| JP | 2017-067764 | 4/2017 |
| JP | 2017-101983 | 6/2017 |

OTHER PUBLICATIONS

Office Action dated Apr. 22, 2021 with respect to the corresponding Chinese Patent Application No. 201880076802.7.

International Search Report for PCT/JP2018/035938 dated Dec. 18, 2018.

Office Action dated Jan. 30, 2022 with regard to the corresponding Chinese patent application No. 201880076802.7.

STRAIN GAUGE WITH IMPROVED DESIGN TO REDUCE PINHOLES AND DAMAGE

TECHNICAL FIELD

The present invention relates to a strain gauge.

BACKGROUND ART

A strain gauge is known to be attached to a measured object to detect strain on the measured object. The strain gauge includes a resistor for detecting strain, and as a resistor material, for example, material including Cr (chromium) or Ni (nickel) is used. The resistor is formed on a substrate made of, for example, an insulating resin (see, for example, Patent document 1).

CITATION LIST

Patent Document

[Patent document 1] Japanese Unexamined Patent Application Publication No. 2016-74934

SUMMARY

However, when a resistor is formed on a flexible substrate, there are cases of pinholes being generated. If the number of pinholes being generated in the resistor exceeds a predetermined value, gauge characteristics may deteriorate, or the resistor may not serve as a strain gauge.

In view of the point described above, an object of the present invention is to reduce the number of pinholes with respect to a strain gauge including a resistor formed on or above a flexible substrate.

A strain gauge includes a flexible substrate; and a resistor formed of material including at least one from among chromium and nickel, on or above the substrate, wherein surface unevenness on one surface of the substrate is 15 nm or less, and wherein the resistor has a film thickness of 0.05 μmm or more.

Effects of the Invention

According to the disclosed technique, with respect to a strain gauge including a resistor formed on or above a flexible substrate, the number of pinholes can be reduced.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
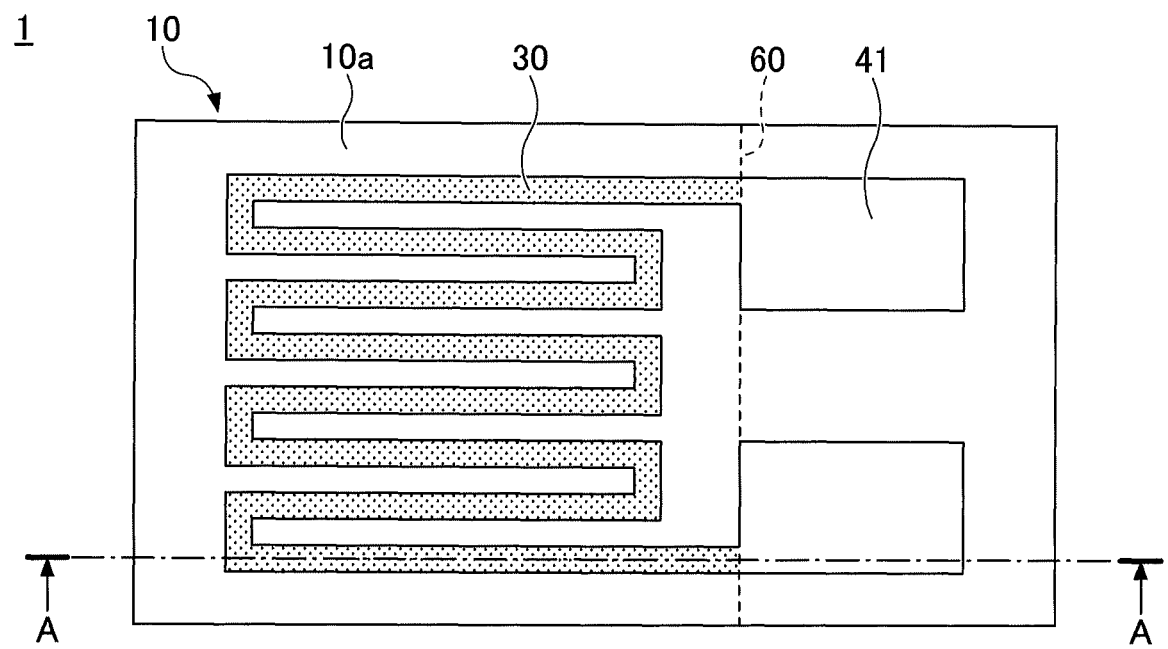
FIG. 1 is a plan view of an example of a strain gauge according to a first embodiment.
Figure 2:
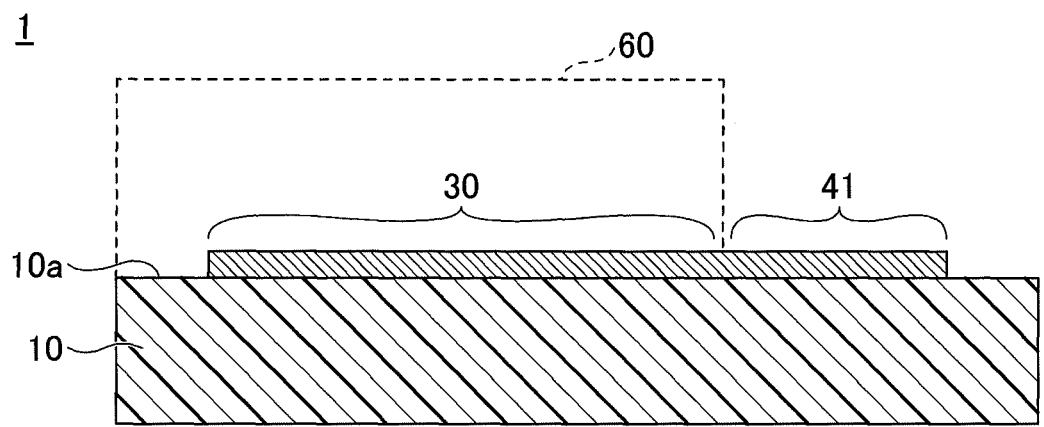
FIG. 2 is a cross-sectional view (part 1) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates a cross section taken along the A-A line in FIG. 1. With reference to FIGS. 1 and 2, the strain gauge 1 includes a substrate 10, a resistor 30, and terminal sections 41.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or an upper surface; and the surface on the side where the resistor 30 is not provided is referred to as another surface or a lower surface. However, the strain gauge 1 can be used in a state of being upside down, or be disposed at any angle. Further, a plan view means that an object is viewed from a normal direction of an upper surface 10a of the substrate 10, and a planar shape refers to a shape of an object when viewed from the normal direction of the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor 30 is a thin film formed in a predetermined pattern and is a sensitive section where resistance varies according to strain. The resistor 30 may be formed directly on the upper surface 10a of the substrate 10, or be formed above the upper surface 10a of the substrate 10, via other layer(s). Note that in FIG. 1, for the sake of convenience, the resistor 30 is illustrated in a crepe pattern.

The resistor 30 can be formed of, for example, material including Cr (chromium); material including Ni (nickel); or material including both of Cr and Ni. In other words, the resistor 30 can be formed of material including at least one from among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, Cr$_2$N, and the like. The Cr composite film may include incidental impurities such as chromium oxide.

The thickness of the resistor 30 is not particularly restricted, and can be appropriately selected for any purpose. The thickness can be, for example, approximately between 0.05 μmm and 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reduction in cracks of a given film caused by internal stress of the film that constitutes the resistor 30, or reduction in warp in the substrate 10.

For example, when the resistor 30 is the Cr composite film, the resistor is formed with α-Cr (alpha-chromium) as the main component having a stable crystalline phase, so that stability of the gauge characteristics can be improved. Additionally, when the resistor 30 is formed with α-Cr as the main component, a gauge factor of the strain gauge 1 can be 10 or more, as well as a gauge factor temperature coefficient TCS and temperature coefficient of resistance TCR can be each in the range of from −1000 ppm/° C. to +1000 ppm/° C. Here, a main component means that a target substance has 50% by weight or more of total substances that constitute the resistor. The resistor 30 preferably includes α-Cr of 80% by weight or more, from the viewpoint of improving the gauge characteristics. Note that α-Cr is Cr having a bcc structure (body-centered cubic structure).

When the resistor 30 is formed above the substrate 10, pinholes may be generated in the resistor 30. If the number of pinholes that are generated in the resistor 30 exceeds a predetermined value, the gauge characteristics might deteriorate, or the resistor might not serve as a strain gauge. The inventors have recognized that one of causes of a pinhole being generated in the resistor 30 relates to filler protruding from the upper surface 10a of the substrate 10.

In other words, when the substrate 10 includes a filler, a portion of the filler protrudes from the upper surface 10a of the substrate 10, so that surface unevenness on the upper surface 10a of the substrate 10 increases. As a result, the number of pinholes that are generated in the resistor 30 formed above the upper surface 10a of the substrate 10 increases, which results in deterioration of the gauge characteristics, and the like.

The inventors have found that, when the thickness of the resistor 30 is 0.05 μmm or more, in a case where the surface unevenness on the upper surface 10a of the substrate 10 is 15 nm or less, the number of pinholes that are generated in the resistor 30 can be suppressed to maintain the gauge characteristics.

In other words, when the thickness of the resistor 30 is 0.05 μmm or more, the surface unevenness on the upper surface 10a of the substrate 10 is preferably 15 nm or less, from the viewpoint of reducing the number of pinholes that are generated in the resistor 30 formed above the upper surface 10a of the substrate 10 to maintain the gauge characteristics. When the surface unevenness is 15 nm or less, even in a case where the substrate 10 includes fillers, the gauge characteristics do not deteriorate. Note that the surface unevenness on the upper surface 10a of the substrate 10 may be 0 nm. The surface unevenness on the upper surface 10a of the substrate 10 can be reduced by, for example, heating the substrate 10. Alternatively, instead of heating the substrate 10, a method of scraping a protrusion by approximately vertically irradiating the upper surface 10a of the substrate 10 with laser light; a method of cutting a protrusion by moving a water cutter or the like to be parallel to the upper surface 10a of the substrate 10; a method of polishing the upper surface 10a of the substrate 10 with a grinding wheel; a method of pressing the substrate 10 while heating (heat press); or the like, may be used.

Note that the surface unevenness means arithmetical mean roughness, and is generally expressed by Ra. The surface unevenness can be measured by, for example, three-dimensional optical interferometry.

The terminal sections 41 respectively extend from both end portions of the resistor 30 and are each wider than the resistor 30 to be in an approximately rectangular shape, in a plan view. The terminal sections 41 are a pair of electrodes from which a change in a resistance value of the resistor 30 according to strain is output externally, where, for example, a lead wire for an external connection, or the like is joined. For example, the resistor 30 extends zigzagged back and forth from one of the terminal sections 41 to another terminal section 41. The upper surface of each terminal section 41 may be coated with a metal allowing for better solderability than the terminal section 41. Note that for the sake of convenience, the resistor 30 and the terminal sections 41 are expressed by different numerals. However, the resistor and the terminal sections can be integrally formed of the same material, in the same process.

A cover layer 60 (insulating resin layer) may be disposed on and above the upper surface 10a of the substrate 10, such that the resistor 30 is coated and the terminal sections 41 are exposed. With the cover layer 60 being provided, mechanical damage, and the like can be prevented from occurring in the resistor 30. Additionally, with the cover layer 60 being provided, the resistor 30 can be protected against moisture, and the like. Note that the cover layer 60 may be provided to cover all portions except for the terminal sections 41.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 μm and 30 μm.

In order to manufacture the strain gauge 1, first, the substrate 10 is prepared and the resistor 30 and the terminal sections 41 each of which has the planar shape illustrated in FIG. 1 are formed. The material and thickness for each of the resistor 30 and the terminal sections 41 are the same as the material and thickness described above. The resistor 30 and the terminal sections 41 can be integrally formed of the same material.

The resistor 30 and the terminal sections 41 are formed, for example, such that a raw material capable of forming the resistor 30 and the terminal sections 41 is a target to be deposited by magnetron sputtering, and such that patterning is performed by photolithography. Instead of magnetron sputtering, the resistor 30 and the terminal sections 41 may be deposited by reactive sputtering, vapor deposition, arc ion plating, pulsed laser deposition, or the like.

From the viewpoint of stabilizing the gauge characteristics, before depositing the resistor 30 and the terminal sections 41, preferably, as a base layer, a functional layer having a film thickness that is approximately between 1 nm and 100 nm is vacuum-deposited on the upper surface 10a of the substrate 10, by conventional sputtering, for example. Note that, after forming the resistor 30 and the terminal sections 41 on the entire upper surface of the functional layer, the functional layer, as well as the resistor 30 and the terminal sections 41, are patterned in the planar shape illustrated in FIG. 1, by photolithography.

In the present application, the functional layer refers to a layer that has a function of promoting crystal growth of the resistor 30 that is at least an upper layer. The functional layer preferably further has a function of preventing oxidation of the resistor 30 caused by oxygen and moisture included in the substrate 10, as well as a function of improving adhesion between the substrate 10 and the resistor 30. The functional layer may further have other functions.

The insulating resin film that constitutes the substrate 10 contains oxygen and moisture. In this regard, particularly when the resistor 30 includes Cr, it is effective for the functional layer to have a function of preventing oxidation of the resistor 30, because Cr forms an autoxidized film.

The material of the functional layer is not particularly restricted as long as it is material having a function of promoting crystal growth of the resistor 30 that is at least an upper layer. Such material can be appropriately selected for any purpose, and includes one or more types of metals selected from a group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium) Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of film of the functional layer is minimized and thus an effect of improving adhesion can be obtained.

However, this is an example of a method of depositing the functional layer, and the functional layer may be formed by other methods. For example, before depositing the functional layer, the upper surface 10a of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer and the material of the resistor 30 and the terminal sections 41 is not particularly restricted, and can be appropriately selected for any purpose. For example, Ti is used for the functional layer, and a Cr composite film formed with α-Cr (alpha-chromium) as the main component can be deposited as the resistor 30 and the terminal sections 41.

In this case, each of the resistor 30 and the terminal sections 41 can be deposited by, for example, magnetron sputtering in which a raw material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR can be each in the range of from −1000 ppm/° C. to +1000 ppm/° C. Note that, when the functional layer is formed of Ti, the Cr composite film may include Ti or TiN (titanium nitride).

Note that when the resistor 30 is a Cr composite film, the functional layer formed of Ti includes all functions being a function of promoting crystal growth of the resistor 30; a function of preventing oxidation of the resistor 30 caused by oxygen or moisture contained in the substrate 10; and a function of improving adhesion between the substrate 10 and the resistor 30. Instead of Ti, when the functional layer is formed of Ta, Si, Al, or Fe, the functional layer also includes the same functions.

As described above, with the functional layer being provided in the lower layer of the resistor 30, the crystal growth of the resistor 30 can be promoted and thus the resistor 30 having a stable crystalline phase can be fabricated. As a result, with respect to the strain gauge 1, the stability of the gauge characteristics can be improved. Also, the material that constitutes the functional layer is diffused into the resistor 30, so that the gauge characteristics of the strain gauge 1 can be thereby improved.

After forming the resistor 30 and the terminal sections 41, the cover layer 60 with which the resistor 30 is coated and that exposes the terminal sections 41 is formed on and above the upper surface 10a of the substrate 10, as necessary, so that the strain gauge 1 is completed. For example, the cover layer 60 can be fabricated, such that a thermosetting insulating resin film in a semi-cured state is laminated on the upper surface 10a of the substrate 10, and such that the resistor 30 is coated therewith and the terminal sections 41 are exposed; subsequently, heat is added and curing is performed. The cover layer 60 may be formed, such that a thermosetting insulating resin that is liquid or paste-like is applied to the upper surface 10a of the substrate 10, and such that the resistor 30 is coated therewith and the terminal sections 41 are exposed; subsequently, heat is added and curing is performed.

Figure 3:
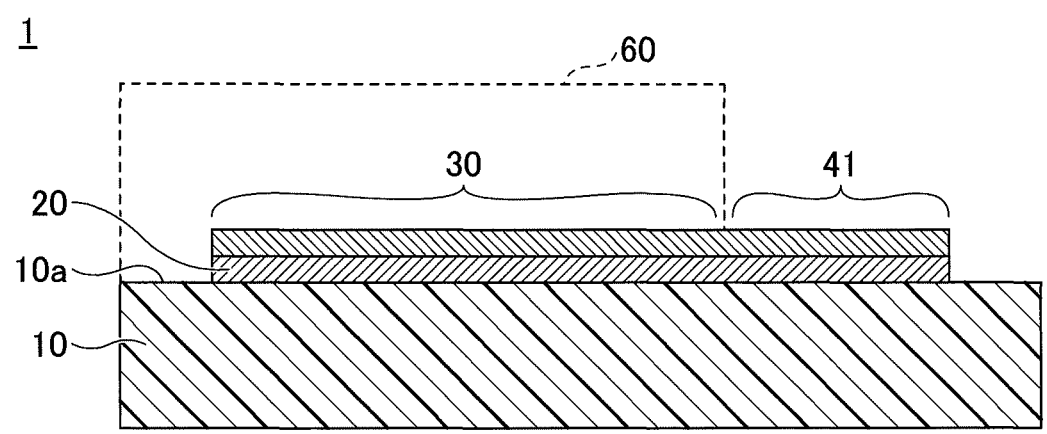
FIG. 3 is a cross-sectional view (part 2) of an example of the strain gauge according to the first embodiment.

Note that when the functional layer, as a base layer of the resistor 30 and the terminal sections 41, is provided on the upper surface 10a of the substrate 10, the strain gauge 1 has a cross-section shape illustrated in FIG. 3. A layer expressed by the numeral 20 indicates the functional layer. The planar shape of the strain gauge 1 in the case of providing the functional layer 20 is the same as that in FIG. 1.

EXAMPLE 1

In Example 1, multiple substrates 10 each formed of a polyimide resin that had a thickness of 25 μm and that contained fillers were prepared. Three sets of samples, each of which included a sample not being subject to heat treatment; a sample being subject to heat treatment at a temperature of 100° C.; a sample being subject to heat treatment at a temperature of 200° C.; and a sample being subject to heat treatment at a temperature of 300° C., were fabricated. Then, the samples were returned to be at normal temperature, and surface unevenness on the upper surface 10a of each substrate 10 was measured by three-dimensional optical interference.

Next, the resistor 30 having a film thickness of 0.05 μmm was deposited on the upper surface 10a of each substrate 10, by magnetron sputtering, and patterning was performed by photolithography, as illustrated in FIG. 1. Then, the number of pinholes that were generated in the resistor 30 was measured by a light transmission method in which light was transmitted from a back surface of a given sample.

Figure 4:
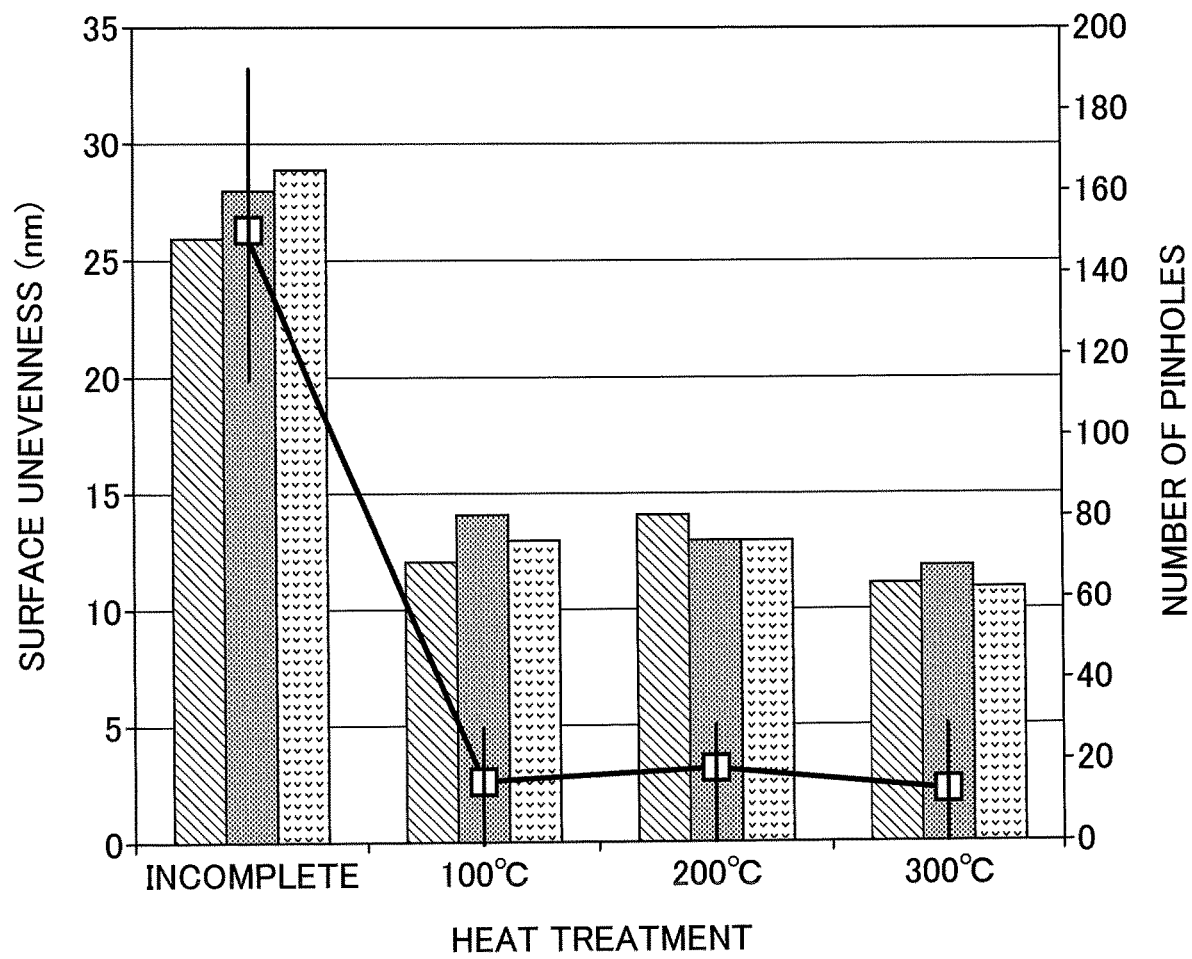
FIG. 4 is a diagram illustrating a relationship between surface unevenness of a substrate and the number of pinholes of a resistor.

Next, based on a measured result, a relationship between surface unevenness on the upper surface 10a of a given substrate 10 and the number of pinholes that were generated in a given resistor 30 was summarized in FIG. 4. Note that each bar graph illustrated in FIG. 4 shows surface unevenness, and a line graph shows the number of pinholes. Additionally, for the horizontal axis, 100° C., 200° C., and 300° C. each indicate a temperature when a given substrate 10 was subject to heat treatment, and Incomplete indicates that heat treatment is not carried out.

FIG. 4 indicates that when a given substrate 10 is heated at temperatures between 100° C. and 300° C., the surface unevenness on the upper surface 10a of the substrate 10 is 15 nm or less, which is about half of surface unevenness in a case of Incomplete, and that as a result, the number of pinholes in the resistor 30 is drastically reduced to about ⅐. Note, however, that in consideration of resistance to thermal temperature of a polyimide resin, when heat treatment is carried out at temperatures exceeding 250° C., alteration or deterioration may occur. Accordingly, it is preferable that the heat treatment be carried out at temperatures between 100° C. and 250° C. Note that it is considered that the surface unevenness is reduced by heat treatment because fillers are contained in a polyimide resin that constitutes the substrate 10, during thermal shrinkage caused by the heat treatment.

According to consideration by the inventors, the number of pinholes (about 140) in the case of Incomplete, as illustrated in FIG. 4, indicates a level of the gauge characteristics deteriorating. In contrast, the number of pinholes (about 20) after heat treatment, indicates a level of the gauge characteristics not being adversely affected. In other words, when the resistor 30 having a film thickness of 0.05 μmm is used, in a case where the surface unevenness on the upper surface 10a of the substrate 10 is 15 nm or less, it was confirmed that the number of pinholes that were generated in the resistor 30 could be reduced to indicate a level of the gauge characteristics not being adversely affected.

Note that when the resistor 30 having a film thickness of greater than 0.05 μmm is used, it is obvious that when the surface unevenness on the upper surface 10a of the substrate 10 is 15 nm or less, the number of pinholes that are generated in the resistor 30 can be reduced to indicate a level of the gauge characteristics not being adversely affected. In other words, with the surface unevenness on the upper surface 10a of the substrate 10 being 15 nm or less, when the resistor 30 having a film thickness of 0.05 μm or more is used, the number of pinholes that are generated in the resistor 30 can be reduced to indicate a level of the gauge characteristics not being adversely affected.

As described above, with the substrate 10 being subject to heat treatment, the surface unevenness on the upper surface 10a of the substrate 10 can be 15 nm or less, and as a result, the number of pinholes that are generated in the resistor 30 having a film thickness of 0.05 μmm or more can be significantly reduced. As a result, the strain gauge 1 can function stably in a manner such that good gauge characteristics are maintained.

Note that in order to reduce the number of pinholes that are generated in the resistor 30, it is important to reduce the surface unevenness on the upper surface 10a of the substrate 10, and a method of reducing surface unevenness is not important. In the above description, the method of reducing surface unevenness by heat treatment has been described, but is not limited to this case. Any method may be used as long as the surface unevenness on the upper surface 10a of the substrate 10 can be reduced. The surface unevenness on the upper surface 10a of the substrate 10 can be reduced by, for example, a method of scraping a protrusion by approximately vertically irradiating the upper surface 10a of the substrate 10, with laser light; a method of cutting a protrusion by moving a water cutter or the like to be parallel to the upper surface 10a of the substrate 10; a method of polishing the upper surface 10a of the substrate 10 with a grinding wheel; a method of pressing the substrate 10 while heating (heat press); or the like.

Further, in order to reduce the number of pinholes that are generated in the resistor 30, it is important to reduce the surface unevenness on the upper surface 10a of the substrate 10, and is not necessarily limited to being directed to surface unevenness caused by the fillers that are present. It is effective to reduce surface unevenness not being caused by the fillers that are present, by various methods described above. For example, when surface unevenness on the substrate 10 without containing fillers is greater than 15 nm, in a case where the surface unevenness on the upper surface 10a of the substrate 10 is 15 nm or less, by various methods described above, the number of pinholes that are generated in the resistor 30 having a film thickness of 0.05 μmm or more can be reduced to a level of the gauge characteristics not being adversely affected.

EXAMPLE 2

In Example 2, multiple strain gauges 1 were each fabricated using a given substrate 10 being subject to heat treatment at a temperature of 200° C.

First, the substrate 10 that was formed of a polyimide resin having a thickness of 25 μm was subject to heat treatment at a temperature of 200° C. Then, Ti as the functional layer 20, which had a film thickness of 3 nm, was vacuum-deposited on the upper surface 10a of the substrate 10, by conventional sputtering.

Subsequently, a Cr composite film, as the resistor 30 and the terminal sections 41, was deposited on the entire upper surface of the functional layer 20, by magnetron sputtering, and then the functional layer 20, the resistor 30, and the terminal sections 41 were patterned by photolithography, as illustrated in FIG. 1.

Then, the gauge characteristics of each sample in Example 2 were measured. As a result, the gauge factor of each sample in Example 2 was between 14 and 16. Also, for each sample in Example 2, the gauge factor temperature coefficient TCS and temperature coefficient of resistance TCR were each in the range of from −1000 ppm/° C. to +1000 ppm/° C.

As described above, when the substrate 10 being subject to heat treatment at a temperature of 200° C. was used, it was confirmed that the strain gauge 1 having good gauge characteristics was fabricated. The great reduction in the number of pinholes that were generated in the resistor 30 is considered to contribute to have good gauge characteristics. Note that the presence of the functional layer 20 is considered not to result in increase in the number of pinholes that are generated in the resistor 30.

The preferred embodiment and the like have been described above in detail, but are not limited thereto. Various modifications and alternatives to the above embodiment and the like can be made without departing from a scope set forth in the claims.

This International application claims priority to Japanese Patent Application No. 2017-191822, filed Sep. 29, 2017, the contents of which are incorporated herein by reference in their entirety.

REFERENCE SIGNS LIST 1 strain gauge, 10 substrate, 10a upper surface, 20 functional layer, 30 resistor, 41 terminal section, 60 cover layer

The invention claimed is:

1. A strain gauge comprising:
a flexible resin substrate;
a functional layer formed of a metal, an alloy, or a metal compound, directly on one surface of the substrate; and
a resistor formed of a film that includes Cr, CrN, and $Cr_2N$ and into which an element included in the functional layer is diffused, on one surface of the functional layer,
wherein a gauge factor of the strain gauge is 10 or more,
wherein the substrate includes a filler,
wherein surface unevenness on the one surface of the substrate is 15 nm or less, and
wherein the resistor has a film thickness of 0.05 μm or more.

2. The strain gauge according to claim 1, wherein the functional layer includes one or more metals selected from the group consisting of Cr, Ti, V, Nb, Ta, Ni, Y, Zr, Hf, Si, C, Zn, Cu, Bi, Fe, Mo, W, Ru, Rh, Re, Os, Ir, Pt, Pd, Ag, Au, Co, Mn, and Al; an alloy of any metals from among the group; or a compound of any metal from among the group.

3. The strain gauge according to claim 2, wherein the functional layer includes one or more metals selected from the group consisting of Cr, V, Nb, Ta, Ni, Y, Hf, C, Zn, Bi, Fe, Mo, W, Ru, Rh, Re, Os, Ir, Pt, Pd, Ag, Au, Co, and Mn; an alloy of any metals from among the group; or a compound of any metal from among the group.

4. The strain gauge according to claim 2, wherein the functional layer includes one metal compound selected from the group consisting of TiN, TaN, $Si_3N_4$, $TiO_2$, $Ta_2O_5$, and $SiO_2$.

5. The strain gauge according to claim 4, wherein the functional layer includes one metal compound selected from the group consisting of TiN, TaN, $Si_3N_4$, and $Ta_2O_5$.

6. The strain gauge according to claim 2, wherein the functional layer includes one alloy selected from the group consisting of FeCr, TiAl, FeNi, NiCr, and CrCu.

7. The strain gauge according to claim 1, wherein the functional layer protects the resistor from oxidation; suppresses movement of oxygen and moisture present in the substrate into the resistor; and/or improves adhesion between the substrate and the resistor.

8. The strain gauge according to claim 1, wherein the functional layer is patterned in a same planar shape as the resistor.

9. The strain gauge according to claim 1, wherein the functional layer has a thickness of from 1 nm to 100 nm.

10. A strain gauge comprising:
a flexible resin substrate;
a functional layer formed of a metal, an alloy, or a metal compound, directly on one surface of the substrate; and
a resistor formed of a film that includes Cr, CrN, and $Cr_2N$ and into which an element included in the functional layer is diffused, on one surface of the functional layer,
wherein a temperature coefficient of resistance of the strain gauge is in a range of from −1000 ppm/° C. to +1000 ppm/° C.,
wherein the substrate includes a filler,
wherein surface unevenness on the one surface of the substrate is 15 nm or less, and
wherein the resistor has a film thickness of 0.05 μm or more.

11. A strain gauge comprising:
a flexible resin substrate;
a functional layer formed of a metal, an alloy, or a metal compound, directly on one surface of the substrate; and
a resistor formed of a film including Cr, CrN, and $Cr_2N$, on one surface of the functional layer,
wherein the substrate includes a filler,
wherein surface unevenness on the one surface of the substrate is 15 nm or less, and
wherein the resistor has a film thickness of 0.05 μm or more.

* * * * *